(12) United States Patent
Liu et al.

(10) Patent No.: US 10,477,089 B2
(45) Date of Patent: Nov. 12, 2019

(54) IMAGE ANALYSIS METHOD, CAMERA AND IMAGE CAPTURING SYSTEM THEREOF

(71) Applicant: VIVOTEK INC., New Taipei (TW)

(72) Inventors: Cheng-Chieh Liu, New Taipei (TW);
Wen-Pin Hsieh, New Taipei (TW);
Ting-Wei Hsu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 16/228,576

(22) Filed: Dec. 20, 2018

(65) Prior Publication Data

US 2019/0208097 A1 Jul. 4, 2019

(30) Foreign Application Priority Data

Dec. 29, 2017 (TW) .............................. 106146411 A

(51) Int. Cl.
| | |
|---|---|
| *H04N 5/225* | (2006.01) |
| *G08B 13/196* | (2006.01) |
| *H04N 5/232* | (2006.01) |
| *G06T 7/73* | (2017.01) |

(52) U.S. Cl.
CPC ............ *H04N 5/2259* (2013.01); *G06T 7/73* (2017.01); *G08B 13/19602* (2013.01); *H04N 5/23216* (2013.01); *H04N 5/23299* (2018.08); *G06T 2207/30232* (2013.01)

(58) Field of Classification Search
CPC ............. H04N 5/2259; H04N 5/23216; G08B 13/19602; G06T 2207/30232
See application file for complete search history.

(56) References Cited

U.S. PATENT DOCUMENTS

| | | | |
|---|---|---|---|
| 8,482,609 B1 * | 7/2013 | Mishra ................... | H04N 7/181 348/143 |
| 8,780,177 B2 * | 7/2014 | Eccles ................... | H04N 17/002 348/46 |
| 9,767,365 B2 * | 9/2017 | Robinson ............. | G06K 9/6202 |
| 2012/0051594 A1 * | 3/2012 | Kim ................... | G06K 9/00771 382/103 |
| 2018/0374208 A1 * | 12/2018 | Liu ....................... | G06T 7/0008 |

* cited by examiner

*Primary Examiner* — Tsion B Owens
(74) *Attorney, Agent, or Firm* — Winston Hsu

(57) ABSTRACT

An image analysis method is applied to estimating a mounting position of a camera and includes utilizing the camera to capture an image toward a target region. The image includes at least one object of interest. The object of interest has a pixel height in the image. The image analysis method further includes obtaining an inclining angle and a rolling angle of the camera relative to the target region, calculating a mounting height of the camera relative to the target region according to an input height and the pixel height of the object of interest, an image capturing parameter of the camera, the inclining angle and the rolling angle, and performing video content analysis on the image according to the image capturing parameter, the inclining angle, the rolling angle and the mounting height of the camera.

12 Claims, 5 Drawing Sheets

IMAGE ANALYSIS METHOD, CAMERA AND IMAGE CAPTURING SYSTEM THEREOF

BACKGROUND OF THE INVENTION

1. Field of the Invention

The present invention relates to an image analysis method, a camera and an image capturing system thereof, and more specifically, to an image analysis method, a camera and an image capturing system thereof for estimating a mounting position of a camera.

2. Description of the Prior Art

In general, a surveillance camera is usually mounted on a high place (e.g. an external wall of a tall building) to capture images toward a target region and then perform video content analysis (VCA) on the captured images for subsequent image surveillance application (e.g. pedestrian or vehicle traffic statistics). However, it is not easy to obtain practical mounting parameters (e.g. a mounting height, a vertical rolling angle and a horizontal rolling angle of the surveillance camera relative to the target region) of the surveillance camera precisely during the mounting process of the surveillance camera. Thus, a large deviation usually occurs in object identification based on the images captured by the surveillance camera if the position relationship between the surveillance camera and the target region cannot be obtained in advance. In such a manner, the size and height of an object in the captured images cannot be identified correctly. As a result, the prior art usually needs more complicated computation for image identification and analysis, which greatly increases calculation time of the surveillance camera in video content analysis so as to considerably influence immediacy and accuracy of the surveillance camera in image surveillance application.

SUMMARY OF THE INVENTION

The present invention provides an image analysis method applied to estimating a mounting position of a camera. The image analysis method includes utilizing the camera to capture at least one image toward a target region. The at least one image includes at least one object of interest. The at least one object of interest has a pixel height in the at least one image. The image analysis method further includes obtaining an inclining angle and a rolling angle of the camera relative to the target region, calculating a mounting height of the camera relative to the target region according to an input height and the pixel height of the at least one object of interest, and an image capturing parameter, the inclining angle and the rolling angle of the camera, and performing video content analysis on the at least one image according to the image capturing parameter, the inclining angle, the rolling angle and the mounting height of the camera.

The present invention further provides a camera including an image capturing module, an angle calculation module, and an image analysis module. The image capturing module captures at least one image toward a target region. The at least one image includes at least one object of interest. The at least one object of interest has a pixel height in the at least one image. The angle calculation module is electrically connected to the image capturing module. The angle calculation module obtains an inclining angle and a rolling angle of the image capturing module relative to the target region. The image analysis module is electrically connected to the image capturing module and the angle calculation module. The image analysis module calculates a mounting height of the image capturing module relative to the target region according to an input height and the pixel height of each object of interest, and an image capturing parameter, the inclining angle and the rolling angle of the image capturing module. The image analysis module performs video content analysis on the at least one image according to the image capturing parameter, the inclining angle, the rolling angle and the mounting height of the image capturing module.

The present invention further provides an image capturing system including a camera, an image capturing device, and an image analysis device. The camera captures at least one image toward a target region. The at least one image includes at least one object of interest. The at least one object of interest has a pixel height in the at least one image. The angle calculation device is electrically connected to the camera. The angle calculation device obtains an inclining angle and a rolling angle of the camera relative to the target region. The image analysis device is electrically connected to the camera and the angle calculation device. The image analysis device calculates a mounting height of the camera relative to the target region according to an input height and the pixel height of each object of interest, and an image capturing parameter, the inclining angle and the rolling angle of the camera. The image analysis device performs video content analysis on the at least one image according to the image capturing parameter, the inclining angle, the rolling angle and the mounting height of the camera.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
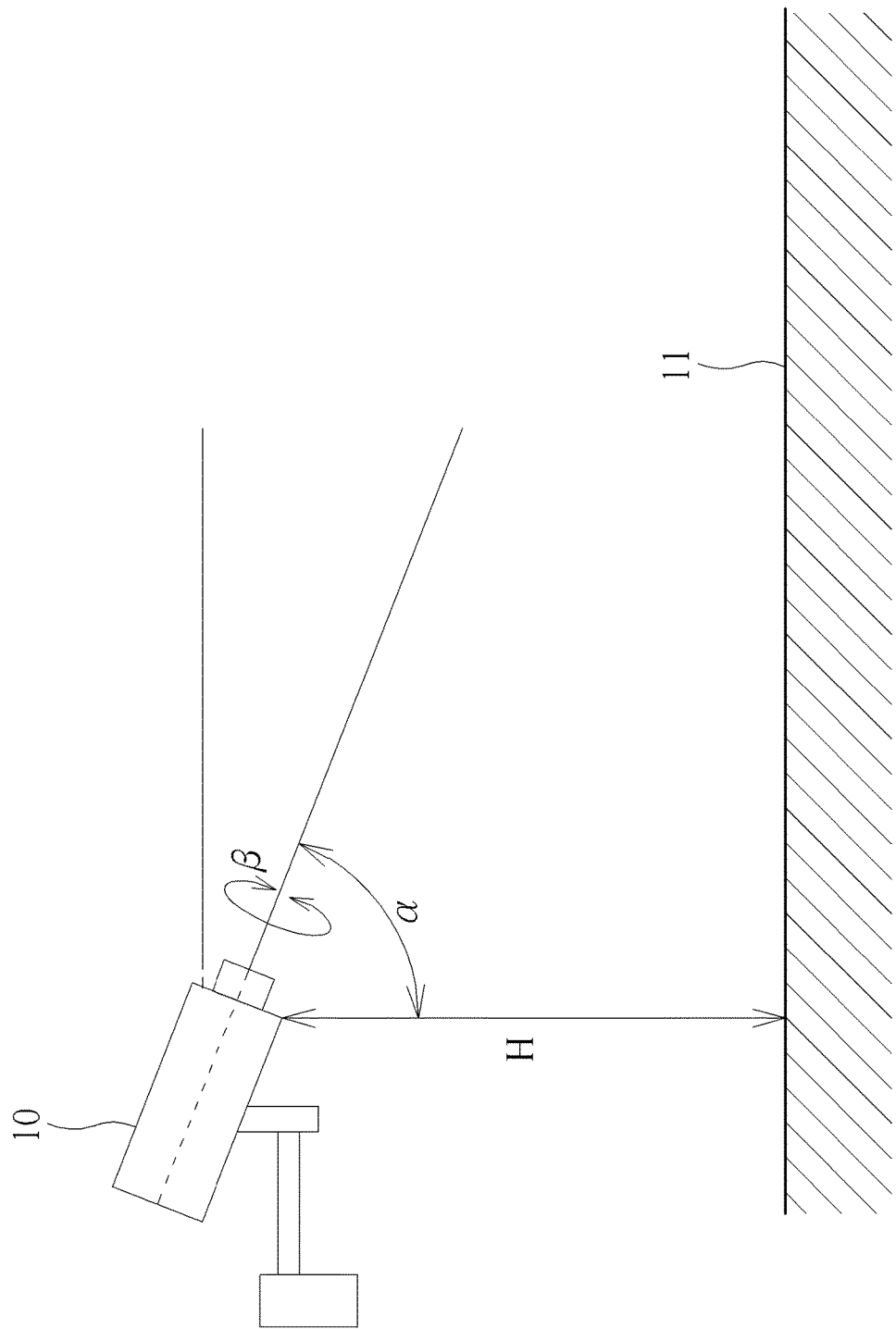
FIG. 1 is a diagram of a camera capturing images toward a target region according to an embodiment of the present invention.
Figure 2:
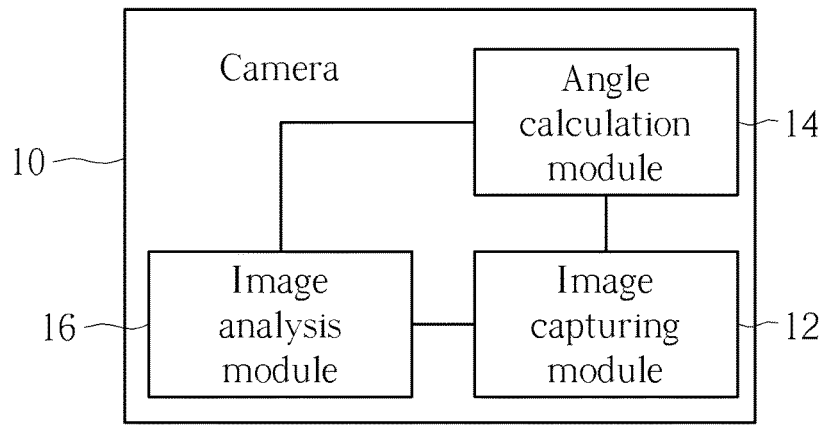
FIG. 2 is a functional block diagram of the camera in FIG. 1.

Please refer to FIG. 1 and FIG. 2. FIG. 1 is a diagram of a camera 10 capturing images toward a target region 11 according to an embodiment of the present invention. FIG. 2 is a functional block diagram of the camera 10 in FIG. 1. As shown in FIG. 1 and FIG. 2, the camera 10 is preferably an image surveillance apparatus (e.g. IP camera, but not limited thereto). The camera 10 includes an image capturing module 12, an angle calculation module 14, and an image analysis module 16. The image capturing module 12 is used for capturing images toward the target region 11 (e.g. a sidewalk). The angle calculation module 14 is hardware, software or firmware (could be directly built in the camera 10, but not limited thereto) used for calculating the inclining condition of the image capturing module 12. The angle calculation module 14 is electrically connected to the image capturing module 12 for obtaining an inclining angle α and a rolling angle β of the image capturing module 12 relative to the target region 11 as shown in FIG. 1 and FIG. 2. The inclining angle α is used for defining the vertical tilt degree of the image capturing module 12 relative to the target region 11. For example, if the inclining angle α is equal to 90°, it represents an image capturing axis L of the image capturing module 12 is substantially parallel to the target region 11. On the contrary, if the inclining angle α is not equal to 90°, it represents the image capturing axis L of the image capturing module 12 is tilted upward or downward relative to the target region 11. The rolling angle β is used for defining the horizontal rolling degree of the image capturing module 12 relative to the target region 11 as the image capturing module 12 takes the image capturing axis L as a rotating axis. For example, if the rolling angle β is equal to 0°, it represents the image capturing module 12 does not roll horizontally relative to the target region 11. On the contrary, if the rolling angle β is not equal to 0°, it represents the image capturing module 12 rolls leftward or rightward relative to the target region 11.

The image analysis module 16 is hardware, software or firmware (could be directly built in the camera 10, but not limited thereto) used for performing image identification analysis on an image captured by the image capturing module 12. The image analysis module 16 is electrically connected to the image capturing module 12 and the angle calculation module 14 for calculating a mounting height H of the image capturing module 12 as shown in FIG. 1 and FIG. 2 according to a pixel height and an input height of an object of interest in the image and an image capturing parameter, the inclining angle α and the rolling angle β of the image capturing module 12. The image analysis module 16 is further used for performing video content analysis (e.g. pedestrian or vehicle traffic statistics or video event tracking) on the image captured by the image capturing module 12 according to the image capturing parameter, the inclining angle α, the rolling angle β, and the mounting height H of the image capturing module 12. To be noted, the image capturing parameter includes related image forming parameters (could be system default parameters of the image capturing module 12) set in the image capturing module 12 for subsequent angle calculation references of the angle calculation module 14. In this embodiment, the image capturing parameter could preferably include at least one of a focal-length parameter, a principal-point parameter and a distortion-coefficient parameter, which means type of image capturing parameter adopted by the angle calculation module 14 could be varied according to the practical application of the camera 10. For example, if the image capturing module 12 utilizes a fisheye lens to capture images, image distortion occurs in the images captured by the image capturing module 12. In this condition, the angle calculation module 14 takes the distortion-coefficient parameter into consideration during the angle calculation process for the image capturing module 12, so as to improve calculation accuracy of the inclining angle α and the rolling angle β.

Figure 3:
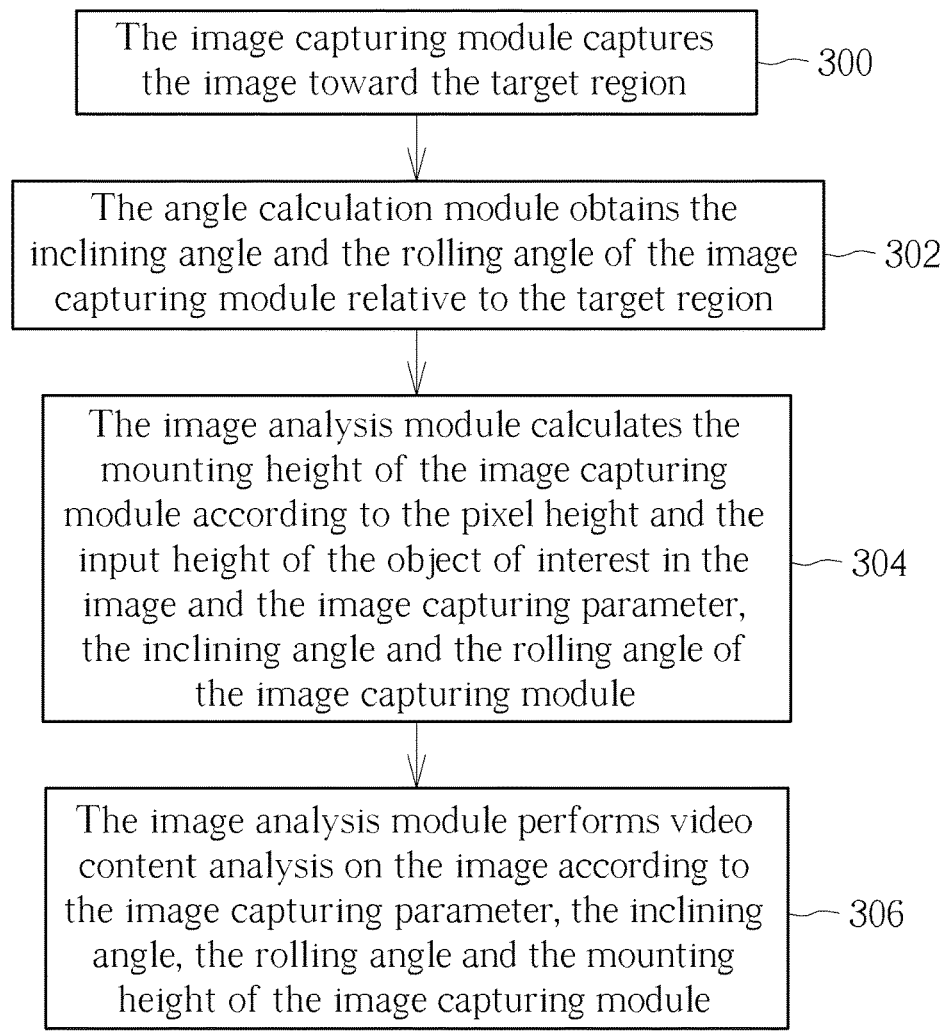
FIG. 3 is a flowchart of an image analysis method according to an embodiment of the present invention.
Figure 4:
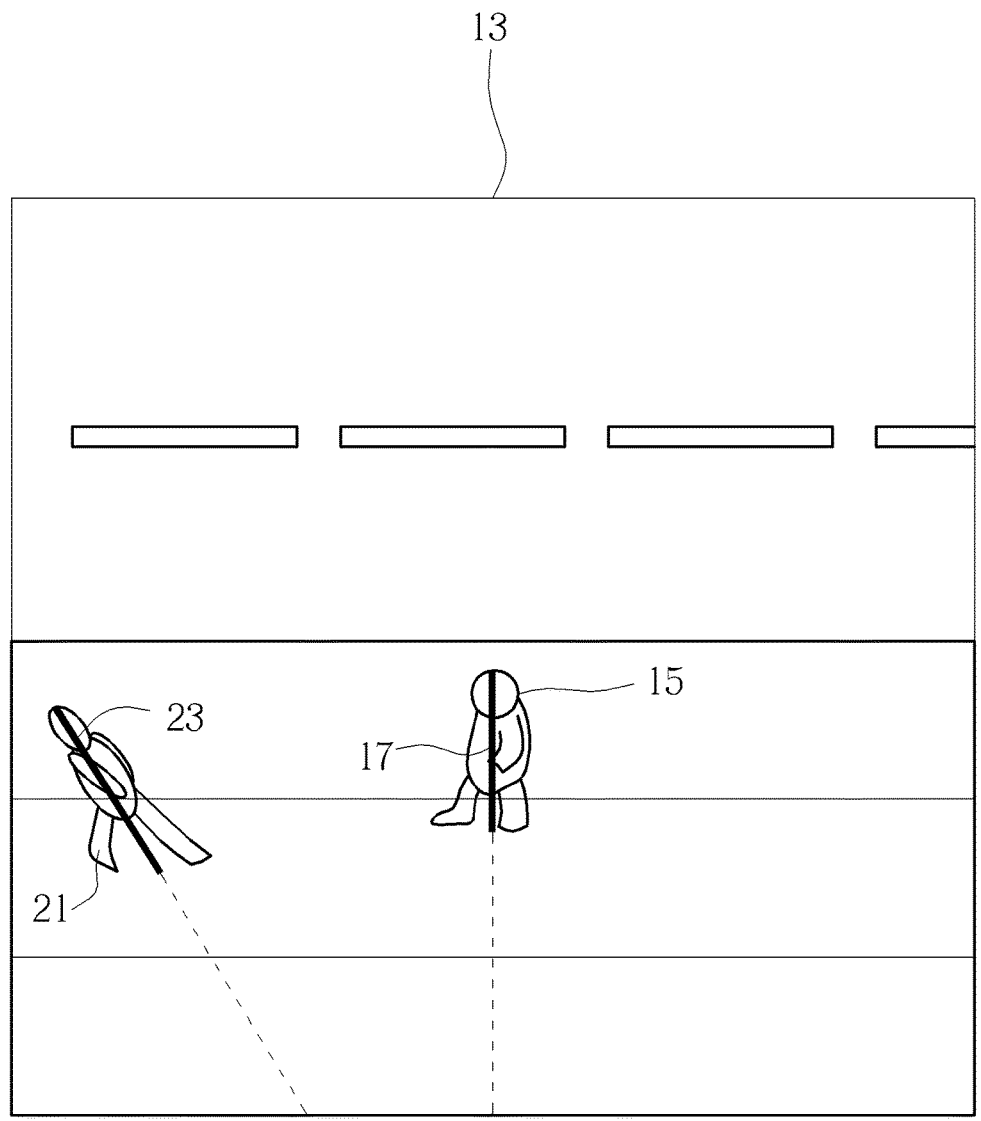
FIG. 4 is a diagram of an image captured by the camera in FIG. 1 toward the target region.
Figure 5:
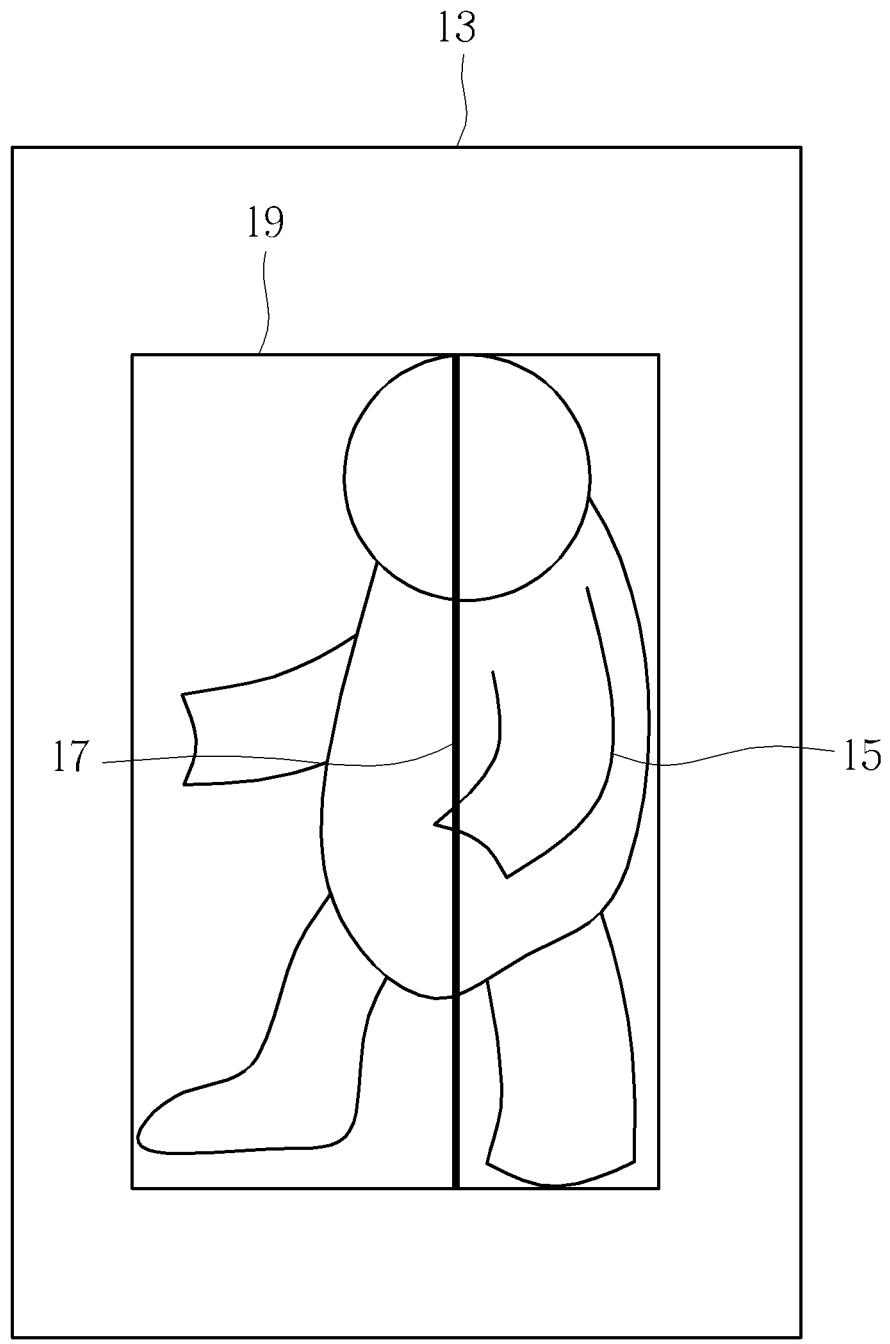
FIG. 5 is an enlarged diagram of an object of interest in the image in FIG. 4.

The image analysis method performed by the camera 10 is described as follows. Please refer to FIGS. 1-5. FIG. 3 is a flowchart of the image analysis method according to an embodiment of the present invention. FIG. 4 is a diagram of an image 13 captured by the camera 10 in FIG. 1 toward the target region 11. FIG. 5 is an enlarged diagram of an object of interest 15 in the image 13 in FIG. 4. The image analysis method of the present invention includes the following steps.

Step 300: The image capturing module 12 captures the image 13 toward the target region 11.

Step 302: The angle calculation module 14 obtains the inclining angle α and the rolling angle β of the image capturing module 12 relative to the target region 11.

Step 304: The image analysis module 16 calculates the mounting height H of the image capturing module 12 according to a pixel height and an input height of an object of interest in the image 13 and the image capturing parameter, the inclining angle α and the rolling angle β of the image capturing module 12.

Step 306: The image analysis module 16 performs video content analysis on the image 13 according to the image capturing parameter, the inclining angle α, the rolling angle β and the mounting height H of the image capturing module 12.

More detailed description for the aforesaid steps is provided as follows in the condition that the image 13 captured by the image capturing module 12 has a plurality of objects of interest (i.e. objects of interest 15 and 21 as shown in FIG. 4, but not limited thereto). As for the image analysis process for other objects of interest (not shown in FIG. 4) in the image 13 and other images captured by the image capturing module 12, the related description could be reasoned by analogy according to the following description and omitted herein.

In Step 300, the image capturing module 12 captures the image 13 as shown in FIG. 4 toward the target region 11, and the objects of interest 15 and 21 could have corresponding pixel heights respectively in the image 13. In Step 302, the angle calculation module 14 obtains the inclining angle α and the rolling angle β of the image capturing module 12 relative to the target region 11. To be more specific, in this embodiment, the angle calculation module 14 could calculate the inclining angle α and the rolling angle β preferably by a method of establishing a representative vertical line in an object of interest in an image. For example, the angle calculation module 14 could obtain a mark of the object of interest 15 in the image 13 according to a conventional image identification method, such as adopting a neural network algorithm to identify a representative frame 19 of the object of interest 15 as shown in FIG. 5 in the image 13 or adopting a conventional contour identification method to obtain terminal contours (e.g. head and foot contours) of the object of interest 15, for subsequent representative line calculation. As for the related description for adopting an image identification method to obtain a mark of an object of interest for establishing a representative vertical line in an object of interest, it could be commonly seen in the prior art and omitted herein.

After obtaining the marks of the objects of interest 15 and 21 in the image 13, as shown in FIG. 4 and FIG. 5, the angle calculation module 14 establishes a representative vertical line 17 in the object of interest 15 and a representative vertical line 23 in the object of interest 21. Subsequently, the angle calculation module 14 calculates an intersection-point coordinate of the representative vertical line 17 and the representative vertical line 23, which could be regarded as an estimated mounting position of the image capturing module 12. In such a manner, the angle calculation module 14 calculates the inclining angle α and the rolling angle β according to the aforesaid intersection-point coordinate and focal-length and principal-point coordinates (could be calculated by the aforesaid image capturing parameter) of the image capturing module 12. To be further specific, according to practical experimental experience and related equation derivation, the angle calculation module 14 could preferably adopt the following equations to obtain the inclining angle α and the rolling angle β of the image capturing module 12.

the inclining angle $\alpha = \tan^{-1}\{[(V_x - C_x)*f_y]/[(V_y - C_y)*f_x]\}$;

the rolling angle $\beta = \tan^{-1}\{[(V_y - C_y)/\cos(\alpha)]*f_y]\}$;

wherein $(V_x, V_y)$ is the intersection-point coordinate, $(f_x, f_y)$ is the focal-length coordinate, $(C_x, C_y)$ is the principal-point coordinate, and $V_x$, $V_y$, $f_x$, $f_y$, $C_x$ and $C_y$ are natural numbers (could be positive integers or negative integers).

In practical application, for improving calculation accuracy of the inclining angle α and the rolling angle β, the angle calculation module 14 could calculate the inclining angle α and the rolling angle β further according to a plurality of intersection-point coordinates generated by representative vertical lines of a plurality of objects of interest. In brief, besides the aforesaid objects of interest 15 and 21, the angle calculation module 14 can establish representative vertical lines of other objects of interest, and can calculate a plurality of intersection-point coordinates according to head and tail coordinates of the representative vertical line of each object of interest and head and tail coordinates of the representative vertical line of another corresponding object of interest. For example, if there are N objects of interest in the image 13, the angle calculation module 14 could calculate N*(N−1) intersection-point coordinates. Subsequently, the angle calculation module 14 can calculate a plurality of estimated inclining angles and a plurality of estimated rolling angles respectively according to the plurality of intersection-point coordinates, the aforesaid focal-length coordinate and the aforesaid principal-point coordinate. Finally, the angle calculation module 14 preferably adopts the RANSAC (RANdom Sample Consensus) algorithm (the related description is commonly seen in the prior art and omitted herein) to filter the plurality of estimated inclining angles and the plurality of estimated rolling angles for calculating an optimum inclining angle and an optimum rolling angle, and sets the optimum inclining angle and the optimum rolling angle as the inclining angle α and the rolling angle β respectively. Accordingly, the present invention can further improve accuracy of the angle calculation module 14 in calculation of the inclining angle α and the rolling angle β.

After the angle calculation module 14 calculates the inclining angle α and the rolling angle β of the image capturing module 12, the image analysis module 16 could utilize the related geometric equations (e.g. trigonometric functions) to calculate the mounting height H of the image capturing module 12 according to the pixel height and the input height of the object of interest 15 (or the object of interest 21) and the image capturing parameter, the inclining angle α and the rolling angle β of the image capturing module 12. The input height (e.g. an average pedestrian height, such as 170 cm, but not limited thereto) could be preferably input by a user. Finally, in the condition that the image analysis module 16 has obtained the position relationship between the image capturing module 12 and the target region 11 (i.e. the inclining angle α, the rolling angle β and the mounting height H of the image capturing module 12 as shown in FIG. 1), the image analysis module 16 can perform video content analysis on the image 13 according to the image parameter, the inclining angle α, the rolling angle β, and the mounting height H of the image capturing module 12 (Step 306).

In such a manner, via the aforesaid image analysis method, the present invention can estimate the practical mounting parameters automatically and precisely without inputting the related mounting parameters in advance (e.g. requesting the user to manually input the inclining angle, the rolling angle, and the mounting height of the image capturing module 12 after the mounting process of the camera 10 has been completed) or obtaining the related mounting parameters by a huge and complicated image identification process. Thus, the present invention can greatly reduce the calculation time of the camera in video content analysis so as to efficiently improve immediacy and accuracy of the camera in image surveillance application (e.g. pedestrian or vehicle traffic statistics or video event tracking). Furthermore, even in the condition that a zoom-in/zoom-out operation of the camera is performed due to the user's needs, the camera can directly perform video content analysis on the zoom-in/zoom-out image according to the zoom-in/zoom-out image capturing parameter, the inclining angle and the rolling angle of the image capturing module without recalculation since the practical mounting parameters have been obtained according to the aforesaid image analysis method and the original image capturing parameter of the image capturing module has been known. Accordingly, the present invention can efficiently reduce computation of the camera in video content analysis.

It should be mentioned that the angle calculation module 14 could further calibrate the mounting height H. For example, the angle calculation module 14 could calibrate the head and tail coordinates of the representative vertical line of each object of interest in the image 13 according to the calculated mounting height H, the calculated inclining angle α, the calculated rolling angle β and the image capturing parameter, and the angle calculation module 14 can calibrate the plurality of intersection-point coordinates according to the calibrated head and tail coordinates of each representative vertical line. In such a manner, the angle calculation module 14 can calibrate the inclining angle α and the rolling angle β according to the calibrated intersection-point coordinates and the focal-length coordinate and the principal-point coordinate of the image capturing module 12, and can calibrate the mounting height H according to the pixel height and the input height of each object of interest, the image capturing parameter of the image capturing module 12, and the calibrated inclining angle α and the calibrated rolling angle β, so as to improve the calculation accuracy of the mounting height H.

Furthermore, if the plurality of objects of interest (e.g. a pedestrian on the sidewalk and a motorcycle rider on the road, but not limited thereto) in the images captured by the camera 10 belongs to different height groups, the image analysis module 16 could divide the aforesaid objects of interest into different height groups according to a clustering algorithm (e.g. "video object classification with object size calibration" disclosed by Saptharishi et al. (US20150093035)). Subsequently, according to a mounting height calculated from the objects of interest in one of the height groups, the image analysis module 16 could estimate a practical height of the object of interest in another of the height groups.

For example, after the mounting height H of the image capturing module 12 is calculated according to the pixel heights and the input heights of the objects of interest 15 and 21 (belong to the pedestrian height group) in the image 13 and the image capturing parameter, the inclining angle α and the rolling angle β of the image capturing module 12, the image analysis module 16 could perform video content analysis on the image 13 according to the pixel height of the object of interest in the rider height group and the image capturing parameter, the inclining angle α, the rolling angle β, and the mounting height H of the image capturing module 12, so as to estimate the practical height of the object of interest in the rider height group. As for other derived embodiments, such as the embodiment in which the practical height of the object of interest in another different height group (e.g. a child height group) is estimated according to the mounting height calculated from the objects of interest in the rider height group, the related description could be reasoned by analogy according to the aforesaid embodiment and omitted herein.

Figure 6:
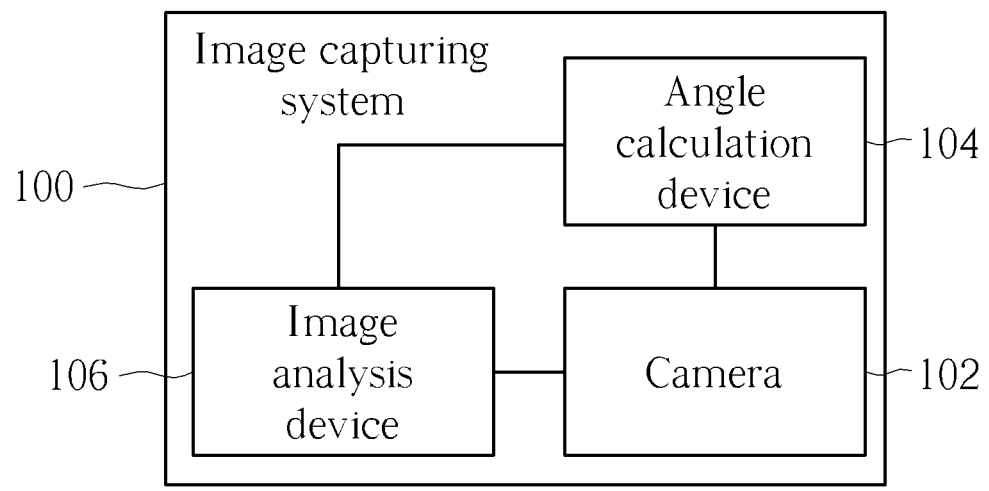
FIG. 6 is a functional block diagram of an image capturing system according to another embodiment of the present invention.

To be noted, the component configuration of the camera for performing the image analysis method of the prevent invention is not limited to the aforesaid embodiments, meaning that the present invention could adopt the design that an angle calculation device is externally coupled to the camera for reducing computation of the camera. For example, as shown in FIG. 6, which is a functional block diagram of an image capturing system 100 according to another embodiment of the present invention, the image capturing system 100 could include a camera 102, an angle calculation device 104 and an image analysis device 106. The camera 102 is used for capturing images toward a target region. The angle calculation device 104 (e.g. a video control host externally coupled to the camera 102) is electrically connected to the camera 102 for obtaining an inclining angle and a rolling angle of the camera relative to the target region. The image analysis device 106 (could be internally built in the camera 102 or externally coupled to the camera 102) is electrically connected to the camera 102 and the angle calculation device 104. The image analysis device 106 is used for calculating a mounting height of the camera 102 according to a pixel height and an input height of an object of interest in an image captured by the camera 102, an image capturing parameter of the camera 102, an inclining angle and a rolling angle of the camera 102. The image analysis device 106 is further used for performing video content analysis on the image according to the image capturing parameter, the inclining angle, the rolling angle and the mounting height of the camera. The detailed description for this embodiment could be reasoned by analogy according to the aforesaid embodiments and omitted herein.

Moreover, the step of obtaining the inclining angle and the rolling angle of the image capturing module relative to the target region is not limited to the aforesaid embodiments, meaning that the present invention could utilize an accelerometer to directly obtain the inclining angle and the rolling angle of the image capturing module in another embodiment. In brief, in another embodiment, the angle calculation module is an accelerometer (could be externally connected to or internally built in the camera). Accordingly, the angle calculation module could directly detect the inclining angle and the rolling angle of the image capturing module without the aforesaid calculation for the inclining angle and the rolling angle, so as to reduce computation of the camera when performing the image analysis method of the present invention.

In practical application, the present invention could further adopt the design of setting a region of interest in the image for reducing computation of the camera. For example, in another embodiment, before the step of calculating the mounting height of the image capturing module is performed, the region of interest could be set in the image (e.g. manually circling the region of interest in the image, such as a sidewalk). Accordingly, the image analysis module could calculate the mounting height of the image capturing module only according to the pixel height and the input height of each object of interest in the region of interest, the image capturing parameter of the image capturing module, and the inclining angle and the rolling angle of the image capturing module, so as to further reduce computation of the camera in video content analysis.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image analysis method applied to estimating a mounting position of a camera, the image analysis method comprising:
   utilizing the camera to capture at least one image toward a target region, the at least one image comprising at least one object of interest, the at least one object of interest having a pixel height in the at least one image;
   obtaining an inclining angle and a rolling angle of the camera relative to the target region;
   calculating a mounting height of the camera relative to the target region according to an input height and the pixel height of the at least one object of interest, and an image capturing parameter, the inclining angle and the rolling angle of the camera; and
   performing video content analysis on the at least one image according to the image capturing parameter, the inclining angle, the rolling angle and the mounting height of the camera.

2. The image analysis method of claim 1, wherein the image capturing parameter comprises at least one of a focal-length parameter, a principal-point parameter and a distortion-coefficient parameter.

3. The image analysis method of claim 1, wherein the step of obtaining the inclining angle and the rolling angle of the camera relative to the target region comprises:
   utilizing an accelerometer to obtain the inclining angle and the rolling angle of the camera relative to the target region.

4. The image analysis method of claim 1, wherein the step of obtaining the inclining angle and the rolling angle of the camera relative to the target region comprises:
   establishing a representative vertical line of each object of interest in the at least one image;
   calculating a plurality of intersection-point coordinates according to head and tail coordinates of the representative vertical line of each object of interest and head and tail coordinates of a representative vertical line of another object of interest;
   calculating a plurality of estimated inclining angles and a plurality of estimated rolling angles according to the plurality of intersection-point coordinates, a focal-length coordinate of the camera, and a principal-point coordinate of the camera;
   calculating an optimum inclining angle and an optimum rolling angle according to the plurality of estimated inclining angles and the plurality of estimated rolling angles; and
   setting the optimum inclining angle and the optimum rolling angle as the inclining angle and the rolling angle of the camera respectively.

5. The image analysis method of claim 4, wherein the image analysis method obtains a mark of each object of interest in the at least one image according to a neural network algorithm and calculates the head and tail coordinates of the representative vertical line of each object of interest according to the image capturing parameter and the mark of each object of interest.

6. The image analysis method of claim 4, wherein the intersection-point coordinate is ($V_x$, $V_y$), the focal-length coordinate is ($f_x$, $f_y$), the principal-point coordinate is ($C_x$, $C_y$), and the inclining angle and the rolling angle are calculated according to the following equations:

the inclining angle=$\tan^{-1}\{[(V_x-C_x)*f_y]/[(V_y-C_y)*f_x]\}$;

the rolling angle=$\tan^{-1}\{[(V_y-C_y)/\cos(\alpha)]*f_y]\}$;

wherein $V_x$, $V_y$, $f_x$, $f_y$, $C_x$ and $C_y$ are natural numbers.

7. The image analysis method of claim 4, wherein the image analysis method filters the plurality of estimated inclining angles and the plurality of estimated rolling angles according to the RANSAC (RANdom Sample Consensus) algorithm to calculate the optimum inclining angle and the optimum rolling angle.

8. The image analysis method of claim 4 further comprising:
calibrating the head and tail coordinates of the representative vertical line of each object of interest according to the mounting height, the inclining angle, the rolling angle and the image capturing parameter;
calibrating the plurality of intersection-point coordinates according to the head and tail coordinates of each representative vertical line and the head and tail coordinates of another representative vertical line after being calibrated;
calibrating the inclining angle and the rolling angle according to the plurality of intersection-point coordinates after being calibrated and the focal-length coordinate and the principal-point coordinate of the camera; and
calibrating the mounting height according to the pixel height and the input height of each object of interest, the image capturing parameter of the camera, and the inclining angle and the rolling angle after being calibrated.

9. The image analysis method of claim 1, wherein the at least one image further comprises at least one another object of interest, the at least one another object of interest has another pixel height in the at least one image, and the image analysis method further comprises:
dividing the at least one object of interest and the at least one another object of interest into at least two height groups according to a clustering algorithm; and
performing video content analysis on the at least one image according to the pixel height of the at least one another object of interest, the image capturing parameter, the inclining angle and the rolling angle of the camera, and the mounting height calculated according to the at least one object of interest corresponding to one height group, to estimate a practical height of the at least one another object of interest corresponding to the other height group.

10. The image analysis method of claim 1, wherein the step of calculating the mounting height of the camera comprises:
setting a region of interest in the image; and
calculating the mounting height of the camera according to the pixel height and input height of each object of interest in the region of interest, the image capturing parameter of the camera, and the inclining angle and the rolling angle of the camera.

11. A camera comprising:
an image capturing module capturing at least one image toward a target region, the at least one image comprising at least one object of interest, the at least one object of interest having a pixel height in the at least one image;
an angle calculation module electrically connected to the image capturing module, the angle calculation module obtaining an inclining angle and a rolling angle of the image capturing module relative to the target region; and
an image analysis module electrically connected to the image capturing module and the angle calculation module, the image analysis module calculating a mounting height of the image capturing module relative to the target region according to an input height and the pixel height of each object of interest, and an image capturing parameter, the inclining angle and the rolling angle of the image capturing module, and the image analysis module performing video content analysis on the at least one image according to the image capturing parameter, the inclining angle, the rolling angle and the mounting height of the image capturing module.

12. An image capturing system comprising:
a camera capturing at least one image toward a target region, the at least one image comprising at least one object of interest, the at least one object of interest having a pixel height in the at least one image;
an angle calculation device electrically connected to the camera, the angle calculation device obtaining an inclining angle and a rolling angle of the camera relative to the target region; and
an image analysis device electrically connected to the camera and the angle calculation device, the image analysis device calculating a mounting height of the camera relative to the target region according to an input height and the pixel height of each object of interest, and an image capturing parameter, the inclining angle and the rolling angle of the camera, and the image analysis device performing video content analysis on the at least one image according to the image capturing parameter, the inclining angle, the rolling angle and the mounting height of the camera.

* * * * *